Patented Aug. 16, 1949

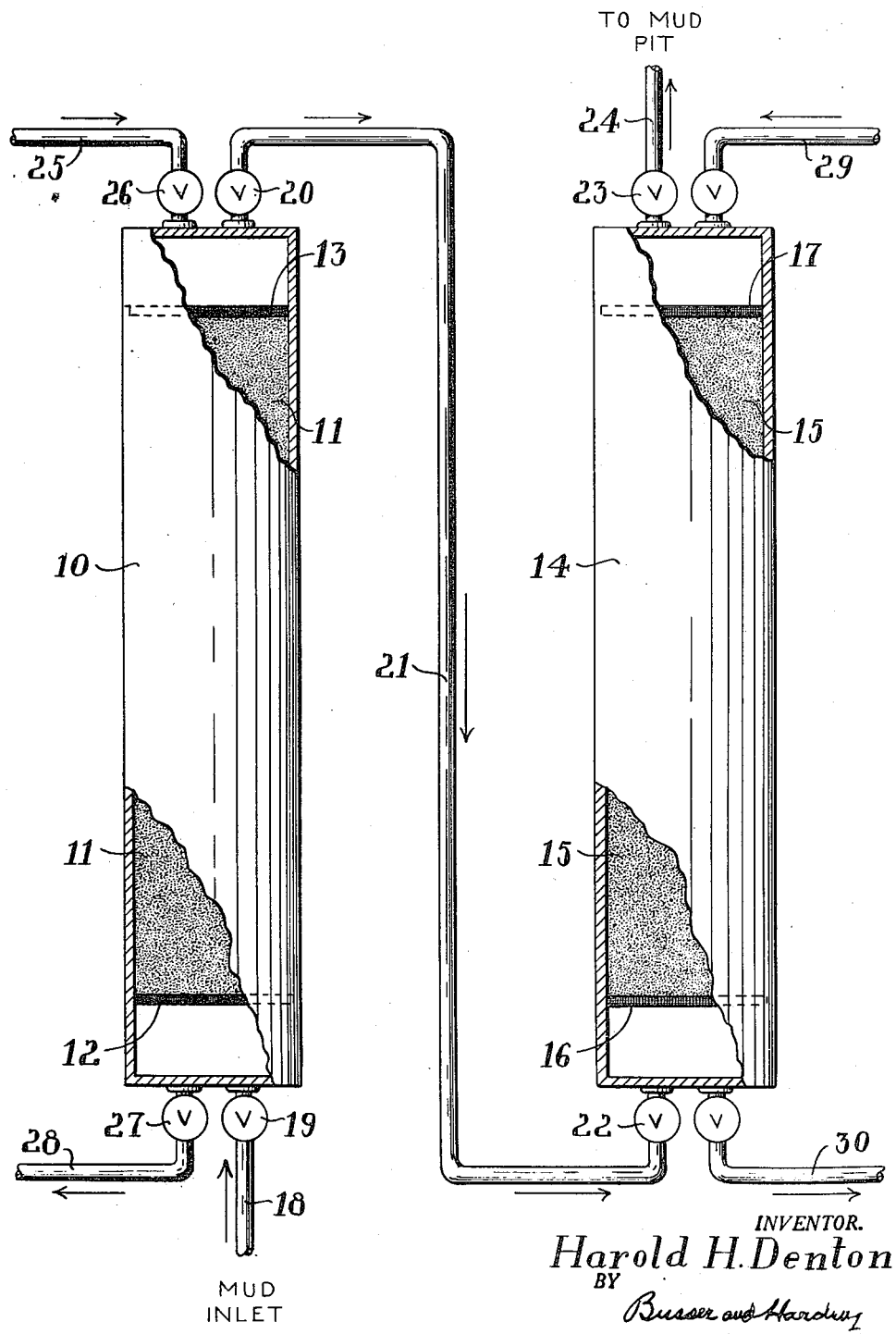

2,479,061

UNITED STATES PATENT OFFICE 2,479,061

TREATMENT OF DRILLING FLUID

Harold H. Denton, Beaumont, Tex., assignor to Sun Oil Company, Philadelphia, Pa., a corporation of New Jersey Application November 23, 1946, Serial No. 711,921

3 Claims. (Cl. 252—8.5)

The present invention relates to the treatment of drilling fluids and particularly concerns a method of reconditioning a drilling fluid which during use has become contaminated with salt from a subterranean stratum.

In drilling oil and gas wells by the rotary method a drilling fluid such as drilling mud is customarily circulated down the drill pipe, through eyes in the drill bit into the annulus between the drill pipe and the borehole and thence to the surface. Its functions are to cool and lubricate the drill bit, to plaster or seal off the formations penetrated and to carry the drill cuttings to the surface. Cuttings are removed from the used drilling mud by screening or by sedimentation or both, and the drilling mud is then reused.

In order that the drilling mud will serve its purpose satisfactorily in the drilling operation, it should possess certain characteristics. First, the drilling mud should be sufficiently fluid to be readily pumpable. Another important characteristic is that of thixotropy, or in other words the ability to undergo gelation when in a quiescent state but readily to become fluid again upon agitation. The rate of gelation and the gel strength should be such as to minimize settling of cuttings within the wellbore at times when the drilling operation is interrupted while still permitting separation of cuttings and entrained gas from the drilling mud returned to the surface during the course of drilling. A further important characteristic of the drilling mud is its sealing property or ability to form an impervious filter cake upon the borehole wall adjacent a permeable formation and thereby prevent loss of water from the drilling fluid to the formation. The undue loss of water to a formation occasioned by a deficiency in the sealing ability of the mud may result in caving of the formation or may impede the oil flow from a productive formation after completion of the well. Also the filter cake within the borehole may be built up to such thickness as to cause the drill pipe to become stuck or at least to render the removal of the drill bit from the borehole more difficult.

During the course of drilling it is not uncommon for the drilling mud to become contaminated with a water-soluble salt from an underground formation. Such salts may comprise the chlorides, sulphates or other objectionable salts of the alkali and alkaline earth metals. For instance, contamination by sodium chloride will occur in drilling through rock salt or when a salt water formation is encountered which is under sufficiently high pressure to cause ingress of saline water into the drilling mud stream. Likewise, alkaline earth metal salts will be encountered in drilling through lime, gypsum, anhydrite or the like. The presence of such salts in the mud generally causes unfavorable changes in the mud properties and often may result in serious difficulties. For example, upon contamination of the drilling mud by sodium chloride, the initial effect is to increase the viscosity, gel rate and gel strength. After the mud has aged for a day or so, however, the viscosity decreases below its original value, and the gel strength decreases frequently to such extent that the drilling fluid can no longer keep the weighing materials in suspension. Also, the drilling mud will lose its sealing properties and the water loss will greatly increase.

The problem of overcoming the adverse effects of salt contamination has been an extremely vexing one and numerous proposals have been made for restoring or partially restoring the desired characteristics. Various substances have been proposed as addition agents for improving the sealing properties of the saline mud, examples being starch, gelatine, albumin, casein, pectin, agar-agar, gum arabic, gum tragacanth, sodium alginate and the like. While in some cases such additives may be useful, frequently they are ineffective to impart the desired sealing characteristics to the contaminated mud. The use of other additives for reducing the viscosity of the saline mud have been proposed. Particularly have phosphate compounds, such as disodium phosphate, sodium acid pyrophosphate, phytic acid, etc., been employed for this purpose. In many instances, however, these likewise are not sufficiently effective in restoring the desired properties to the mud fluid composition. Besides being often ineffective, the use of such additives is generally expensive.

The present invention provides an improved method for reconditioning drilling mud which has become contaminated with one or more of such salts during the drilling operation. According to the invention, salt is removed from the drilling mud by means of ion exchange materials. The process involves the use of two different ion exchange materials in successive treatments, one of said materials being a cation exchanger and the other being an anion exchanger. Thus the process comprises using either a cation exchanger followed by an anion exchanger or an anion exchanger followed by a cation exchanger. The combined effect of the two exchangers is to remove both ions of the salt from the drilling fluid and thus yield a mud of lowered salt content.

More specifically, the method of reconditioning the drilling fluid comprises first treating the drilling fluid with an ion exchange material adapted to remove one of the ions of the salt from solution, separating the drilling fluid from the ion exchange material, then subjecting the so-treated drilling fluid to a second treatment by means of another ion exchange material adapted to remove the other ion of the salt from solution and separating from the last-named ion exchange material treated drilling fluid having a substantially reduced salt content.

For example, when the drilling fluid has become contaminated with sodium chloride, it may be treated first with a cation exchanger adapted to remove the Na+ ion by substituting the H+ ion, thus forming HCl. The drilling fluid may then be treated with an anion exchanger to remove the Cl− ion by substituting either an OH− or a $CO_3^=$ ion, thereby forming either water or carbonic acid. In case the anion exchanger is such that the carbonic acid is produced, the mud may be subjected to a heat treatment to decompose the carbonic acid and drive off carbon dioxide before it is reused in the well drilling operation.

As an alternative procedure, the drilling mud may be treated first with an anion exchanger to substitute either an OH− or a $CO_3^=$ ion for the Cl− ion thereby producing either NaOH or $Na_2CO_3$. The mud may then be treated with a cation exchanger to remove the Na+ ion by substituting a H+ ion thus forming either water or carbonic acid. In case the latter is formed, it may be decomposed by the aforesaid heat treatment before the mud is reused.

Ion exchangers are well known to the art and numerous materials have been proposed for effecting anion and cation exchange reactions. Exchangers suitable for use in the present process may be selected from such known materials. For example, suitable anion exchangers include resins such as phenol-formaldehyde, amine-formaldehyde, aliphatic amines, basic dyestuff such as aniline black, natural inorganic adsorbents such as hydroxyapatite and dolomite and synthetic heavy-metal silicates. Such exchangers are capable of substituting either an OH− or a $CO_3^=$ ion for the Cl− ion of the salt, dependent upon whether the exchanger has been regenerated by means of an alkali metal hydroxide or by means of an alkali metal carbonate solution. After the anion exchanger has been used sufficiently to become relatively saturated with Cl− ions, it may be regenerated for further use by treatment with an aqueous solution of alkali metal hydroxide such as NaOH or with an aqueous solution of alkali metal carbonate such as $Na_2CO_3$. The concentration of these regenerating solutions preferably should be in the order of 2–7% by weight.

The cation exchanger should be one that is capable of exchanging the H+ ion for the alkali metal or alkaline earth metal ion of the salt which contaminates the drilling fluid. Suitable exchangers of this type include resins such as tannin-formaldehyde and phenol-formaldehyde, phenolic sulfonic acid derivatives and sulfonated carbonaceous materials such as coal, lignite and peat. These exchangers after each use may be regenerated by means of dilute acid solutions such as HCl or $H_2SO_4$ to replace the adsorbed cations by means of H+ ions. Suitable concentrations for these regenerating agents also lie in the order of 2–7% by weight.

In practicing the present process, the drilling mud to be treated should first be screened or settled to separate cuttings carried from the well bore. Treatment of the mud with the ion exchange materials may then be carried out by percolating the mud through successive beds of the exchangers. An alternative procedure for effecting the treatment comprises intimately mixing the mud with one of the exchange materials, separating this exchanger from the mud as by screening, then mixing the mud with the other exchange material and subsequently separating it by screening.

The accompanying drawing illustrates one manner of practicing the invention, wherein the drilling mud is treated by percolation through successive beds of the ion exchange materials. A contact zone or filter chamber 10 carries a bed of granular ion exchange material 11 held in place in any suitable manner as by means of screens 12 and 13. A like contact zone or filter chamber 14 contains another bed of ion exchange material 15 similarly maintained in place by means of screens 16 and 17. The exchange materials in the two zones are of different type, one being a cation exchanger and the other an anion exchanger. Each of the exchange materials should have a particle size such that at least 95% will be retainable on 15-mesh screen. This is especially desirable, whether the treating is carried out by filtration according to the arrangement shown in the figure or merely by mixing the mud and exchange material and then screening, in order to minimize plugging of the exchangers by the mud laden drilling fluid and to facilitate separation.

Drilling mud which has been previously screened enters the treating system through line 18 and valve 19, whence it passes into the first contact zone and through the exchange material 11. Thence the mud flows through valve 20, line 21 and valve 22 into the second contact zone containing exchange material 15. The treated mud leaving the treating system through valve 23 and line 24 may then be sent to mud pits for reuse in the drilling operation.

After the effectiveness of the ion exchangers has decreased to a point where regeneration becomes necessary, the flow of mud through the system is stopped and regeneration is begun. In order that the drilling mud may be continuously treated it is desirable to provide at least one other pair of filters, similar to those above described, in which mud may be treated while the used filter beds are being reconditioned for reuse. The regeneration of the used ion exchangers is accomplished by flowing through each filter bed, preferably in the opposite direction to that of the mud flow, a suitable regenerating solution as hereinbefore specified. Thus to regenerate exchange material 11, the regenerating medium may be passed into the top of filter 10 through line 25 and valve 26 and out through valve 27 and line 28. Likewise filter 14 is provided with inlet line 29 through which another suitable regenerating solution may be introduced and with outlet line 30 for disposing of the used solution.

It has been found that the hereindescribed treatment may be used to great advantage in combination with methods heretofore proposed for conditioning salt contaminated muds. For example, in some cases the drilling mud may become so contaminated that known additives such as disodium phosphate, sodium acid pyrophosphate or other phosphorous compounds for controlling the viscosity, or other known additives such as organic colloids for improving the sealing characteristics, will be substantially ineffective. In such cases the drilling mud may be treated first according to the present method to reduce the salt content, following which the treatment with known additives may then be used to still further improve the properties of the mud.

The examples which follow are specific illustrations of how the invention may be applied.

In these examples testing of the mud was done according to the procedures described in the publication entitled "Recommended Practice on Standard Field Procedure for Testing Drilling Fluids," A. P. I. Code No. 29 (July, 1942).

Example I

A drilling mud was prepared from a commercial clay by dispersing the same in water until a weight of 10.0 lbs. per gallon was obtained. Sodium chloride was then added until flocculation occurred whereupon the mud became plastic. Upon aging, the mud became fluid again presumably due to slow diffusion of water from the colloidal clay particles to the saline aqueous phase. The mud, after aging for about a day, was treated with a granular cation exchanger consisting of sulfonated coal, 40 lbs. of the exchanger being used per bbl. of mud. The exchanger had been previously activated by means of a dilute solution of mineral acid. The mud and exchanger were thoroughly mixed and the mixture was then screened to remove the resin. The mud was then treated by mixing with an aliphatic amine anion exchanger which had been activated by means of a dilute solution of sodium hydroxide. The proportion of exchanger to mud again was 40 lbs. per bbl. After this treatment the mud was again screened to remove the exchange material. The following comparative test data were obtained for the aged mud before treatment and for the treated mud:

|  | Before treatment | After treatment |
| --- | --- | --- |
| Chloride content, P. P. M. | 23,100 | 10,850 |
| Viscosity (Stormer), centipoises | 25 | 13 |
| Water loss, cc | 38 | 26 |

It may be seen that the salt content (as indicated by chloride content) was reduced substantially and that there was a resulting decrease in viscosity and an improvement in sealing characteristics as shown by the reduced water loss.

Example II

In the present example another sample of the aged saline mud described in Example I was treated in a similar manner with the same type of exchange materials as described therein, except that in this case the anion exchanger had been activated with a dilute solution of sodium carbonate instead of sodium hydroxide. After the second treating step the mud was heated to about 120° F. to drive off carbon dioxide. The resulting product had the following properties:

Chloride content, P. P. M. _____ 11,900
Viscosity (Stormer), centipoises _____ 20
Water loss, cc _____ 25

Example III

Another portion of the aged saline mud was treated according to the procedure of the previous examples but first with an anion exchanger and then with a cation exchanger, each being used in the proportion of 40 lbs./bbl. The anion exchanger was a phenol-formaldehyde resin activated by means of a sodium hydroxide solution and the cation exchanger was sulfonated coal which had been activated by means of a dilute mineral acid solution. It was found that the treatment reduced the chloride content to 14,000 P. P. M. with a resultant reduction in water loss to 25 cc.

Example IV

Another batch of the aged saline mud of Example I was treated in four successive steps wherein the exchange materials were used in the order of cation:anion:cation:anion. The cation exchanger in each case was sulfonated coal activated by means of a dilute mineral acid and the anion exchanger was an aliphatic amine activated by means of dilute sodium hydroxide. The proportion of exchanger used in each step was 40 lbs. per bbl. of mud. The mud was screened after each step to remove the exchange material. The treated mud was found to have a chloride content of 6300 P. P. M. and a water loss of 11 cc. The treatment thus effected removal of over 70% of the salt and very materially improved the sealing properties of the mud as shown by the low water loss. The treated mud, unlike the original saline mud, was capable of responding to conventional treatment with known additives such as phosphate compounds.

Example V

In this example another portion of the same starting material was treated first with an anion exchanger comprising phenylenediamine-formaldehyde which had been activated by means of a dilute solution of sodium carbonate, and then, after separation of the anion exchanger, with a sulfonated coal cation exchanger activated by means of dilute acid. Each of these exchangers was used in the proportion of 20 lbs. per bbl. of mud. After removing the second exchange material, the mud was heated to drive off carbon dioxide. There was then added to the treated mud a viscosity reducing agent, namely sodium acid pyrophosphate, in the proportion of 0.2 lb. per bbl. The final composition had the following properties:

Chloride content, P. P. M. _____ 14,000
Viscosity (Stormer), centipoises _____ 19
Water loss, cc _____ 26

Example VI

This example was carried out in the same manner and with the same materials as specified in Example V except that the order in which the ion exchange materials were used was reversed, the cation exchanger being used first. Sodium acid pyrophosphate was added to the treated mud in the proportion of 0.5 lb. per bbl. Results were as follows:

Chloride content, P. P. M. _____ 14,000
Viscosity (Stormer), centipoises _____ 15
Water loss, cc _____ 26

Example VII

Another batch of drilling mud was prepared by dispersing a commercial grade of bentonite in water to a weight of 10.1 lbs. per gal. Sodium chloride was added until flocculation occurred. The mixture was permitted to age for three days and was then treated with an anion exchanger followed by a cation exchanger, each being used in the proportion of 15 lbs./bbl. The anion exchanger was an aliphatic amine activated by means of a 2% NaOH solution and the cation exchanger was sulfonated coal activated by means of mineral acid. After each treatment the mud was screened to remove the exchange material. The thus treated mud was again given a similar treatment with additional amounts of the same exchange materials used in the same proportions as before. This was repeated until the mud had received a total of four such treatments with each type of exchanger. Tests of the original aged mud and of the mud after each series of treatments gave the following results:

|  | Chloride Content. P. P. M. | Stormer Viscosity, cp. | Initial Gel Strength, gms. |
|---|---|---|---|
| Before treatment | 29,100 | 52 | 70 |
| After 1st series of treatments | 24,500 | 27 | 40 |
| After 2nd series of treatments | 17,500 | 20 | 27 |
| After 3rd series of treatments | 10,500 | 16 | 20 |
| After 4th series of treatments | 3,500 |  |  |

These results show that large reductions in viscosity and initial gel strength were effected by treatment according to the present invention. On the other hand, when the untreated saline mud was treated in conventional manner by adding thereto sodium acid pyrophosphate up to 0.5 lb./bbl., no substantial reduction in viscosity or initial gel strength was effected.

The selection of the order in which the ion exchangers should be employed in the herein described process may depend to an extent upon what viscosity changes are encountered during treatment of the mud. The viscosity of drilling mud varies with the pH value and generally passes through a minimum at a pH value in the range of 8–9. When the mud is treated first with a cation exchanger, mineral acid is formed by exchange of hydrogen ions for the cations of the salt and consequently the mud will have a low pH value until treated with the anion exchanger. On the other hand, when the mud is treated first with an anion exchanger, alkali (either NaOH or $Na_2CO_3$ dependent upon what activating solution was used) is formed and accordingly the mud will be alkaline until treated with the cation exchanger. In the latter case, an advantage is attained by using an anion exchanger activated by means of a sodium carbonate solution, in that the pH change of the mud during treatment is not as great as when the exchanger has been activated by means of aqueous sodium hydroxide. In any case it may be best to predetermine the effect of pH changes upon viscosity of the particular mud to be treated, so that the ion exchangers may be used in that order which insures the greater fluidity of the mud during treatment.

Having described my invention, what I claim and desire to protect by Letters Patent is:

1. In a well drilling process wherein a drilling mud is circulated through the well bore during the drilling operation and the mud becomes so contaminated with sodium chloride from a subterranean stratum during the course of drilling as to have a chloride content of at least 3500 parts per million, thereby causing an unfavorable change in properties of the mud, the method of reconditioning the drilling mud for further use which comprises removing sodium ions therefrom by treating the drilling mud having the specified chloride content of at least 3500 parts per million with a cation exchange material of particle size such that at least 95% is retainable on 15-mesh screen and adapted to replace said sodium ions with hydrogen ions, separating the drilling mud from said cation exchange material, then removing chloride ions from the drilling mud by subjecting the same to a second treatment with an anion exchange material also of particle size such that at least 95% is retainable on 15-mesh screen, and separating from the anion exchange material treated drilling mud having substantially reduced salt content.

2. In a well drilling process wherein a drilling mud is circulated through the well bore during the drilling operation and the mud becomes so contaminated with sodium chloride from a subterranean stratum during the course of drilling as to have a chloride content of at least 3500 parts per million, thereby causing an unfavorable change in properties of the mud, the method of reconditioning the drilling mud for further use which comprises removing chloride ions therefrom by treating the drilling mud having the specified chloride content of at least 3500 parts per million with an anion exchange material of particle size such that at least 95% is retainable on 15-mesh screen, separating the drilling mud from said anion exchange material, then removing sodium ions from the drilling mud by subjecting the same to a second treatment with a cation exchange material also of particle size such that at least 95% is retainable on 15-mesh screen and adapted to replace said sodium ions with hydrogen ions, and separating from the cation exchange material treated drilling mud having substantially reduced salt content.

3. In a well drilling process wherein a drilling mud is circulated through the well bore during the drilling operation and the mud becomes so contaminated with sodium chloride from a subterranean stratum during the course of drilling so as to have a chloride content of at least 3500 parts per million, thereby causing an unfavorable change in properties of the mud, the method of reconditioning the drilling mud for further use which comprises treating said drilling mud having the specified chloride content of at least 3500 parts per million with an ion exchange material of particle size such that at least 95% is retainable on 15-mesh screen and adapted to remove one of the ions of said sodium chloride from the mud, separating the drilling mud from said ion exchange material, then subjecting the so-treated mud to a second treatment with another ion exchange material also of particle size such that at least 95% is retainable on 15-mesh screen and adapted to remove the other ion of said sodium chloride from the mud, and separating from the last-named ion exchange material treated drilling mud having a substantially reduced sodium chloride content.

HAROLD H. DENTON.

REFERENCES CITED

The following references are of record in the file of this patent:

UNITED STATES PATENTS

| Number | Name | Date |
|---|---|---|
| 2,331,281 | Wayne | Oct. 12, 1943 |
| 2,404,038 | Cardwell | July 16, 1946 |

OTHER REFERENCES

"The Amberlites," Oct. 1942 by the Resinous Products and Chemical Co. of Phila, Penna., pages 3, 4, 6, 7 and 14.

"Synthetic Resins as Exchange Adsorbents," Myers et al., pages 697–706, Industrial and Engineering Chemistry, vol. 33, June 1941.